United States Patent
Heo et al.

(10) Patent No.: US 10,241,553 B2
(45) Date of Patent: *Mar. 26, 2019

(54) APPARATUS AND METHOD FOR WAKING UP A PROCESSOR

(71) Applicant: Samsung Electronics Co., Ltd., Gyeonggi-do (KR)

(72) Inventors: Changryong Heo, Gyeonggi-do (KR); Kenhyung Park, Gyeonggi-do (KR); Kiyeon Park, Gyeonggi-do (KR); Yongyi Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/744,521

(22) Filed: Jun. 19, 2015

(65) Prior Publication Data
US 2015/0286263 A1 Oct. 8, 2015

Related U.S. Application Data

(63) Continuation of application No. 13/595,119, filed on Aug. 27, 2012, now Pat. No. 9,063,731.

(30) Foreign Application Priority Data

Jul. 26, 2013 (KR) .................. 10-2013-0088382

(51) Int. Cl.
*G06F 1/32* (2006.01)
*G06F 1/3206* (2019.01)
(Continued)

(52) U.S. Cl.
CPC .......... *G06F 1/3206* (2013.01); *G06F 1/1694* (2013.01); *G06F 1/3209* (2013.01);
(Continued)

(58) Field of Classification Search
CPC .... G06F 1/3234; G06F 1/3215; G06F 1/3209; Y02B 60/121
(Continued)

(56) References Cited

U.S. PATENT DOCUMENTS 6,070,140 A 5/2000 Tran
6,223,294 B1 4/2001 Kondoh
(Continued)

FOREIGN PATENT DOCUMENTS

EP 2 479 642 A1 7/2012
EP 2 482 167 A1 8/2012
(Continued)

OTHER PUBLICATIONS

Japanese Search Report dated Oct. 24, 2017.
Japanese Search Report dated Jun. 5, 2018.
European Search Report dated Jun. 19, 2018.

*Primary Examiner* — Vincent H Tran
(74) *Attorney, Agent, or Firm* — Cha & Reiter, LLC.

(57) ABSTRACT

An apparatus and method for waking up a main processor (MP) in a low power or ultra-low power device preferably includes the MP, and a sub-processor (SP) that utilizes less power than the MP to monitor ambient conditions than the MP, and may be internalized in the MP. The MP and SP can remain in a sleep mode while an interrupt sensor monitors for changes in the ambient environment. A sensor is preferably an interrupt-type sensor, as opposed to polling-type sensors conventionally used to detect ambient changes. The MP and SP may remain in sleep mode, as a low-power or an ultra-low power interrupt sensor operates with the SP being in sleep mode, and awakens the SP via an interrupt indicating a detected change. The SP then wakes the MP after comparing data from the interrupt sensor with values in storage or with another sensor.

9 Claims, 9 Drawing Sheets

(51) Int. Cl.
  *G06F 1/3209* (2019.01)
  *G06F 1/3215* (2019.01)
  *G06F 1/3293* (2019.01)
  *G06F 3/16* (2006.01)
  *G06F 3/01* (2006.01)
  *G06F 1/16* (2006.01)
  *G06F 1/3231* (2019.01)

(52) U.S. Cl.
  CPC .......... *G06F 1/3215* (2013.01); *G06F 1/3231* (2013.01); *G06F 1/3293* (2013.01); *G06F 3/017* (2013.01); *G06F 3/167* (2013.01); *Y02D 10/122* (2018.01); *Y02D 10/173* (2018.01); *Y02D 50/20* (2018.01)

(58) Field of Classification Search
  USPC ........................................................ 713/320
  See application file for complete search history.

(56) References Cited

U.S. PATENT DOCUMENTS

| | | | |
|---|---|---|---|
| 6,449,496 B1 | 9/2002 | Beith et al. | |
| 6,532,447 B1 | 3/2003 | Christensson | |
| 7,176,902 B2 | 2/2007 | Peterson, Jr. et al. | |
| 7,633,076 B2 | 12/2009 | Huppi et al. | |
| 8,072,379 B2 | 12/2011 | Gopinath | |
| 8,145,053 B2 | 3/2012 | Sakurai | |
| 8,230,246 B1 | 7/2012 | Sharkey | |
| 8,706,172 B2 | 4/2014 | Priyantha et al. | |
| 8,816,985 B1* | 8/2014 | Tate | G06F 3/041 345/173 |
| 8,819,467 B2* | 8/2014 | Park | G06F 1/3209 713/320 |
| 8,912,877 B2 | 12/2014 | Ling et al. | |
| 9,063,731 B2* | 6/2015 | Heo | G06F 1/3206 |
| 9,430,024 B2* | 8/2016 | Heo | G06F 1/3234 |
| 2002/0180724 A1 | 12/2002 | Oshima et al. | |
| 2003/0040339 A1 | 2/2003 | Chang | |
| 2003/0177402 A1 | 9/2003 | Piazza | |
| 2006/0161377 A1 | 7/2006 | Rakkola et al. | |
| 2007/0078487 A1 | 4/2007 | Vaisnys et al. | |
| 2007/0102525 A1 | 5/2007 | Orr et al. | |
| 2007/0140199 A1 | 6/2007 | Zhao et al. | |
| 2007/0273673 A1 | 11/2007 | Park et al. | |
| 2009/0135751 A1 | 5/2009 | Hodges et al. | |
| 2009/0259865 A1 | 10/2009 | Sheynblat et al. | |
| 2009/0278738 A1 | 11/2009 | Gopinath | |
| 2010/0007801 A1 | 1/2010 | Cooper et al. | |
| 2010/0013778 A1 | 1/2010 | Liu et al. | |
| 2010/0235667 A1 | 9/2010 | Mucignat et al. | |
| 2010/0268831 A1* | 10/2010 | Scott | H04W 64/00 709/228 |
| 2010/0302028 A1 | 12/2010 | Desai et al. | |
| 2010/0306711 A1 | 12/2010 | Kahn et al. | |
| 2010/0313050 A1 | 12/2010 | Harrat et al. | |
| 2011/0071759 A1 | 3/2011 | Pande et al. | |
| 2011/0077865 A1 | 3/2011 | Chen et al. | |
| 2011/0105955 A1* | 5/2011 | Yudovsky | G01P 15/0802 600/595 |
| 2011/0126014 A1 | 5/2011 | Camp, Jr. et al. | |
| 2011/0162894 A1 | 7/2011 | Weber | |
| 2012/0005509 A1* | 1/2012 | Araki | G06F 1/3203 713/323 |
| 2012/0096290 A1 | 4/2012 | Shkolnikov et al. | |
| 2012/0100895 A1 | 4/2012 | Priyantha et al. | |
| 2012/0154292 A1 | 6/2012 | Zhao et al. | |
| 2012/0191993 A1* | 7/2012 | Drader | G06F 1/3215 713/320 |
| 2012/0212319 A1 | 8/2012 | Ling et al. | |
| 2012/0254878 A1* | 10/2012 | Nachman | G06F 9/5094 718/102 |
| 2013/0082937 A1* | 4/2013 | Liu | G06F 1/3262 345/173 |
| 2013/0082939 A1 | 4/2013 | Zhao et al. | |
| 2013/0265276 A1* | 10/2013 | Obeidat | G06F 3/044 345/174 |
| 2013/0290761 A1* | 10/2013 | Moon | G06F 1/3215 713/323 |
| 2014/0006825 A1 | 1/2014 | Shenhav | |
| 2014/0025973 A1 | 1/2014 | Schillings et al. | |
| 2014/0049480 A1 | 2/2014 | Rabii | |
| 2014/0075226 A1 | 3/2014 | Heo et al. | |
| 2014/0149754 A1 | 5/2014 | Silva et al. | |
| 2014/0237277 A1 | 8/2014 | Mallinson et al. | |
| 2015/0185909 A1* | 7/2015 | Gecnuk | G06F 3/044 345/174 |

FOREIGN PATENT DOCUMENTS

| | | |
|---|---|---|
| JP | 6-95787 A | 4/1994 |
| JP | 10-333789 A | 12/1998 |
| JP | 11-102253 A | 4/1999 |
| JP | 2002-536917 A | 10/2002 |
| JP | 2003-501959 A | 1/2003 |
| JP | 2005-283843 A | 10/2005 |
| JP | 2011-139301 A | 7/2011 |
| KR | 10-0748984 B1 | 8/2007 |
| KR | 10-2010-0061894 A | 6/2010 |
| KR | 10-2011-0071216 A | 6/2011 |

\* cited by examiner

APPARATUS AND METHOD FOR WAKING UP A PROCESSOR

CROSS REFERENCE TO RELATED APPLICATIONS

This application is a Continuation Application of U.S. patent application Ser. No. 13/595,119 filed on Aug. 27, 2012 and entitled and claims the benefit of an earlier Korean Patent application filed in Korean Intellectual Property Office on Jul. 26, 2013 and assigned Serial No. 10-2013-0088382, the entire disclosure of which is hereby incorporated by reference.

BACKGROUND

Field of the Invention

The present invention relates to a low-power wake-up method for an electronic device having a sensor. More particularly, the present invention relates to ways to reduce battery power utilized by portable devices and facilitate a return of the electronic device to operation from a sleep mode.

Description of the Related Art

In order to save power, which is of particular importance to battery powered devices, conventionally a "sleep mode" has been utilized, typically when the electronic device is an idle state for a predetermined amount of time.

Battery usage in portable electronic devices, including but not limited to cell phones, smart phones, tablets, personal digital assistants (PDA's), portable music players, etc., are just a few of the many types of devices where battery usage is critical, and there continues to be a need to provide more functionality and at the same time reduce power battery usage.

Conventional devices, wherein after a period of time of non-usage, may dim the brightness of the display, or the display goes blank to conserve energy.

For example, with regard to computers, sleep mode is defined as an energy-saving standby condition of a computer which can be reactivated by external stimulus, such as touching the keyboard. For example, when a notebook computer goes into sleep mode, the display screen and disk drive are normally shut down. Once awakened (i.e. sent a specific signal), the computer returns to its former operating status.

Moreover, in the case of portable electronic devices, sleep mode operates, for example, in devices that are in no way limited to smartphones, tablets, music players, Personal Digital Assistant (PDAs), just to name a few possibilities.

In fact, many smartphones now default to a sleep mode when not used, unless actively performing certain tasks. When there are no active user interactions such as screen touches, every component, including the central processor, can stays off unless an app instructs the operating system to keep the device fully powered on.

Moreover, a number of background operations need to be performed while the phone is idle. In one such example, a mailer may need to automatically update email by checking with a remote server. To prevent the phone from going to sleep during such operations, smartphone manufacturers often make application programming interfaces, or APIs, available to app developers. The developers insert the APIs into apps to instruct the phone to stay awake long enough to perform necessary operations.

In a typical smartphone, an Application Processor (AP) is asleep when the device is asleep. In order to wake up the device, conventional systems require the user to press a power button or an unlock button.

Sleep mode saves battery power, particularly when compared with leaving a device in fully operation state while idle, and advantageously permits the user to avoid having to reset programming codes or wait for an electronic device to reboot. In wireless electronic devices, such as portable mobile terminals, tablets, etc., which often seek out networks and have to provide passwords to obtain access upon being rebooted or reset, the use of sleep mode is preferable to a rather cumbersome and slow process or rebooting.

However, to return to an operational mode from a sleep mode (wake mode) requires an action to be undertaken by the user. For example, a power button or an unlock icon must be pressed, which is slow and sometimes awkward, especially when trying to quickly perform an action on the electronic device. Even in the case of a virtual keypad, an unlock icon must be touched or spread in order to restore the electronic device to an operational mode, meaning that the user is inconvenienced by contacting a button of the device, or sliding their finger along a screen.

Some conventional attempts to solve some of the shortcomings include providing a luminance sensor or a camera. However, in such cases the application processor (AP) cannot go into sleep mode and must always be in an operating mode to process sensed data from the sensor or camera. This type of monitoring requires a high amount of power consumption, as it is impossible to control the sensor by the AP directly when the AP is asleep.

Recently, the use of a lower power processor for processing only the sensing data has been configured into the devices. However, the low power processor processes data from the sensor using a polling type, and must be maintained in a wake-up state, using significant amounts of power.

With regard to conventional attempts to address the above-discussed issues, U.S. Pat. Appln. Pub. No. 20100313050 discloses that a sensor processor system selects a power profile to be applied to the application processor system based on the sensed data, and instructs the power management controller to apply the selected power profile to the application processor system. There are two processors used for low power sensing that wakes up the AP when the sensed data meets the condition.

However, a significant drawback to U.S. Pat. Appln. Pub. No. 2010/0313050 is that the sensor processor always operates to monitor ambient environment using a polling type sensor without a sleep mode. The sensor processor applies the power profile to the application processor system (S/W type).

In another conventional attempt to improve the art, in U.S. Pat. Appln. Pub. No. 2009/0259865, the electronic device includes a circuit configured to operate when the main processor is in the sleep mode. The circuit comprises at least one low power processor and a sensor. However, the low power processor in the conventional system always operates without being in sleep mode in order to be able to monitor ambient environment via a polling-type sensor.

Accordingly, there is a need in the art for a system and method that permits additional components to be in sleep mode and yet, provides ambient monitoring of the device, and can permit a switch back to an operating mode from sleep mode quickly without pressing buttons or touching the display screen.

SUMMARY

The summary of the invention is not to be used as a basis to interpret a scope of the appended claims, as the claimed invention is far broader than the description in this summary.

An apparatus and method for waking up a main processor in an ultra-low power device preferably includes a main processor, and a sub-processor that utilizes less power than the main processor, and may be internalized in the main processor. According to an exemplary aspect of the presently claimed invention, at least one sensor is preferably an interrupt-type sensor (as opposed to, for example, a polling-type sensor). One of the many advantages of the presently claimed invention is that both the main processor and the sub-processor can remain in sleep mode, as a low-power or an ultra-low power sensor can operate with the sub-processor being in sleep mode and only awaken after receiving an interrupt signal from the interrupt sensor that a change has been detected.

In addition, the presently claimed invention also permits a return from sleep mode to operating mode by a mere wave of the hand, which is unknown heretofore. Also, shaking the unit, or moving a stylus pen arranged along an exterior of the device are all examples of the many ways the device can be awakened from sleep mode.

BRIEF DESCRIPTION OF THE DRAWINGS

The above and other exemplary aspects of the invention will become more apparent from the following detailed description taken in conjunction with the accompanying drawings, in which.

Figure 1:
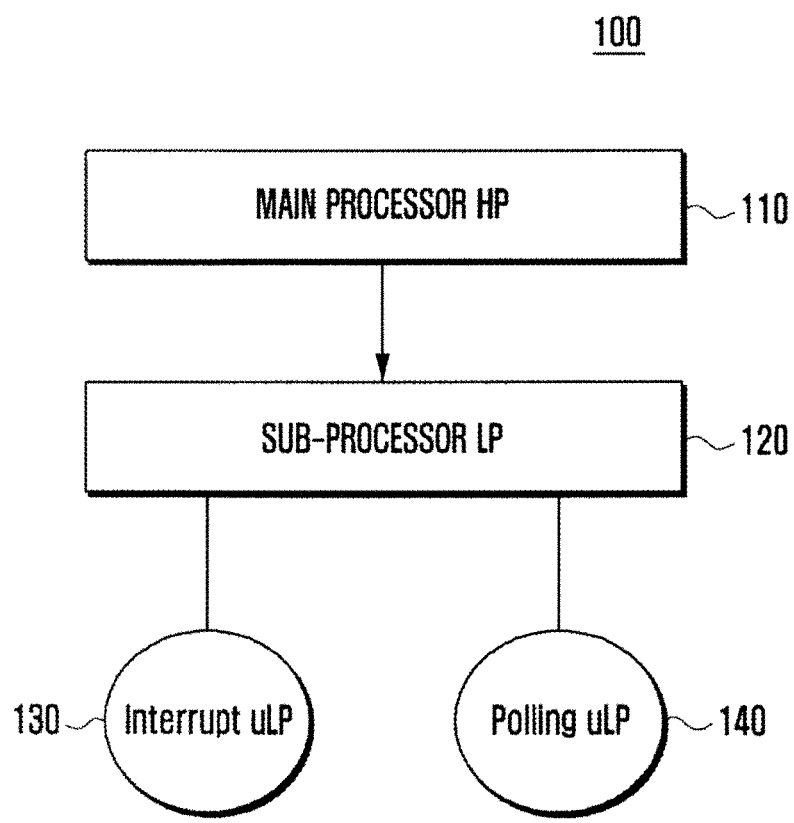
FIG. 1 shows a block diagram of an exemplary depiction of an apparatus according to an exemplary aspect of the invention.

It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and at least one of a low power processor and an ultra-low power sensor to monitor at least one of the signals, commands, inputs, and changes in the environment. The circuit wakes up the main processor responsive to one of the low power processor and the ultra-low power interrupt sensor.

DETAILED DESCRIPTION

The present invention has been described with respect to particular exemplary embodiments and with reference to certain drawings, but the invention is not limited thereto, but rather, is set forth only by the appended claims. The drawings described are only schematic and are non-limiting. In the drawings, for illustrative purposes, the size of some of the elements may be exaggerated and not drawn to a particular scale. Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

Furthermore, the terms "first", "second", "third" and the like, if used in the description and in the claims, are provided for distinguishing between similar elements and not necessarily for describing a sequential or chronological order. It is to be understood that the terms so used are interchangeable under appropriate circumstances (unless clearly disclosed otherwise) and that the exemplary embodiments of the invention described herein and may be operated in other sequences and/or arrangements than are described or illustrated herein.

Definitions

To aide in an understanding of the present invention, an artisan should understand and appreciate that the terms "main processor" and sub-processor" are terminologies used for understanding of the invention, but other terminologies can be interchangeably used in place of main processor and sub-processor having the same meaning.

For example, to aid the artisan, the term "main processor", can be any one of an "application processor", "AP", "first processor", and "processor 1" as used herein all refer to the same processor 110 that is shown in FIG. 1. A high power processor can be referred to as a main processor, or an application processor. The main processor typically is considered high power relative to the low power sub-processor or sensing processor.

In addition, the term "sub-processor", can be any one of a "sensing processor", "MCU", "second processor", "processor 2", "Sensor Hub (Processor)", MCU (Micro Controller Unit", I refer to the same processor 120 that is shown in FIG. 1. An ultra-low power processor can be referred to as any of the above.

An artisan understands and appreciates that the term "ultra-low power" typically refers to a processor operating at power consumption values using less than approximately 1 mA, and often in the µA range. "Ultra-low power levels" refers to power consumption at levels using less than approximately 1 mA.

In addition, the artisan also understands and appreciates that the term "low power" typically refers to a processor (or sub-processor) operating in the 1-10 mA range. The apparatus may comprise a wireless communication device, such as a mobile communication terminal, a cellphone, smart phone, tablet, Personal Digital Assistant (PDA), notebook, netbook, etc. just to name a few possible non-limiting examples of devices.

FIG. 1 shows a block diagram of an exemplary depiction of an apparatus 100 according to an exemplary aspect of the invention that includes a main processor (HP for high power) that is typically an application processor, a sub-processor 120 (LP for low power) that receives information from sensors such as interrupt uLP sensor 130 (ultra-low power) and a polling 140 (that may or may not be ultra-low power).

The sub-processor 120 operates at a low power or ultra-low power, and according to the present invention, the sub-processor can remain in a sleep mode along with the main processor 110 because of the use of an interrupt sensor 130. As discussed herein above, the conventional apparatus uses only a polling sensor that requires either the main processor or the sub-processing to remain fully operational to be able to have the device change from sleep mode to operational mode.

The interrupt sensor 130 operates at ultra-low power levels and sends an interrupt signal to the sub-processor 120 when a predetermined condition is sensed, which can be, for example, waiving one's hand in front of the display, shaking the device, or moving a piece of the device, such as shifting a position of a stylus 475 (FIG. 4) or part of the cover. According to the present invention, the interrupt sensor 130 is operable while the sub-processor 120 is in sleep mode. However, the polling sensor 140 requires the sub-processor to be in awake mode or operating mode (not in sleep mode).

Figure 2:
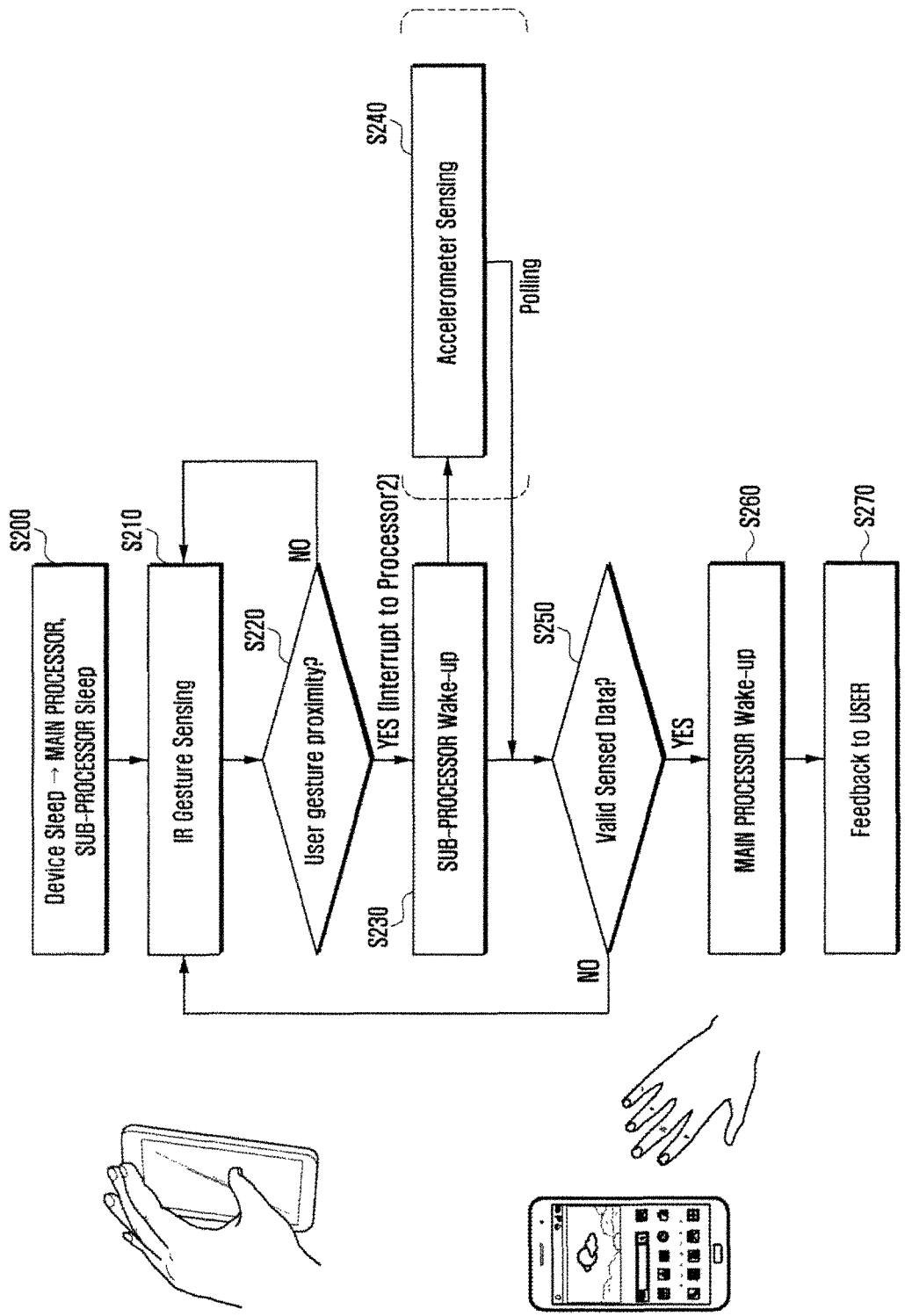
FIG. 2 shows a flowchart illustrating an exemplary operation for gesture sensing according to an exemplary aspect of the invention.

FIG. 2 shows a flowchart illustrating an exemplary operation for gesture sensing according to an exemplary aspect of the invention.

At step 200, the main processor 110 and sub-processor 120 are in sleep mode. At steps 210 and 220, an interrupt sensor 130 (including but not limited to an infrared (IR) sensor) detects gesture sensing within a proximity distance of the electronic device, typically a display or touchscreen. The proximity distance can be, for example, 10-15 cm, but the invention does not require a specific distance, so long as the sensor can recognize the wave of the user's hand.

At step 230, the sub-processor 120 is awakened by the interrupt signal sent from the interrupt sensor 130. Alternatively, at step 240 an accelerometer may detect the device being shaken or waived, and also cause the sub-processor 120 to be awakened.

At step 250, the sub-processor determines whether or not the sensed data from the interrupt sensor 130 is valid by comparing the value with a table in storage.

In addition, a polling sensor 130 can be optionally included so that when the mobile device is placed in a case or bag, the interrupt sensor does not unintentionally operate. Accordingly, the sub-processor wakes up due to the interrupt from the interrupt sensor, and the main processor wakes up when 1) sensing data of the interrupt sensor is within valid range or 2) when sensing data of the polling sensor is within the valid range, with 1) or 2) being determined by the sub-processor at step 250.

After determining by the sub-processor 120 that the data is valid, for example, by being in a valid range, or has reached a predetermined threshold, the sub-processor 120 at step 260 then wakes the main processor 110, which in turn at step 270 provides feedback to the user, in the form of, for example, unlocking the screen, prompting the user, making the display operable, showing a home screen, etc. According to an exemplary aspect of the present invention, the predetermined threshold could be a particular value which if the output is greater than or equal to, is determined by the sub-processor as satisfying the wake up condition(s). In addition, there can be a range of range of values received from the sensor that are predetermined as satisfying a wakeup condition, that being provided only for purposes of illustration and not for limiting the appended claims, such as, for example a microvolt uv (or microamp ua) range. Any other such range (e.g. ma) that is within the capability of the sub-processor to distinguish between values received from the sensor so as ascertain a valid range or predetermined threshold are within the spirit and scope of the claimed invention.

Figure 3A:
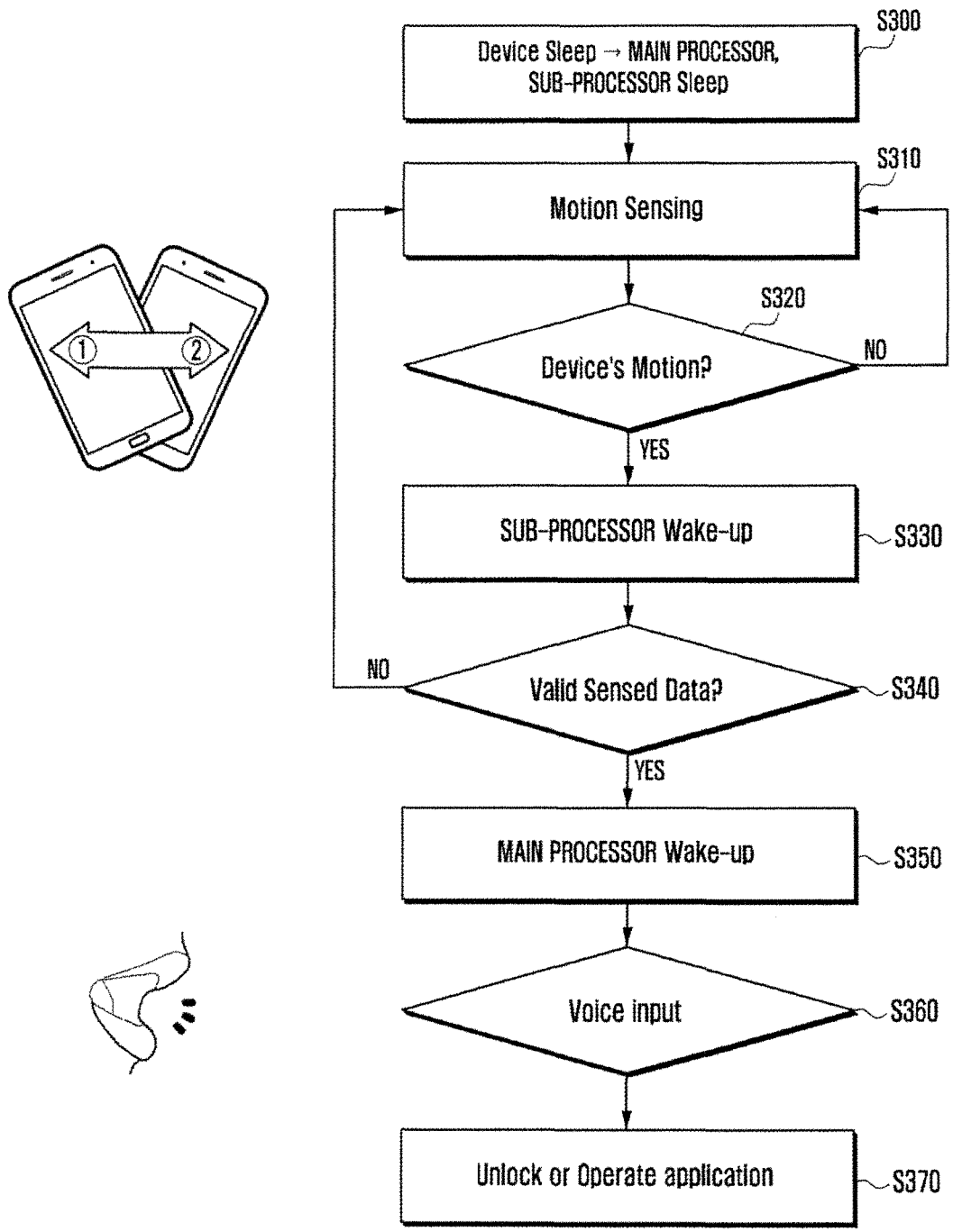
FIG. 3A shows a flowchart illustrating an exemplary operation of a feedback voice input based on device's motion according to an exemplary aspect of the invention.

FIG. 3A shows a flowchart illustrating an exemplary operation of a feedback voice input based on device's motion according to an exemplary aspect of the invention. This particular exemplary embodiment starts at step 300 with the main processor and sub-processor being asleep. A motion detector detects motion at step 310, by sensing the predetermined condition (in this example is the device being shaken or waved) at step 320, and the interrupt signal is sent to the sub-processor 120 to wake up the sensing processor at step 330. Then the sub-processor at step 340 determines whether or not the sensed data is valid, by comparing with values in storage to determine if the data is within a valid range or has reached a predetermined threshold, for example. Upon determining that the sensed data from the interrupt sensor is valid, then at step 350 the sub-processor 120 wakes up the main processor 110. The main processor can be fully operable and wait, for example, for a voice input (step 360), and based on the determined voice input, can either unlock the display screen or execute a function or application (step 370). For further purposes of illustration and not to limit the claimed invention, exemplary protocol between the main processor and sub-processor is discussed herein. The protocol for transmitting is in accordance with the main processor and sub-processor's active or sleep state.

Figure 3B:
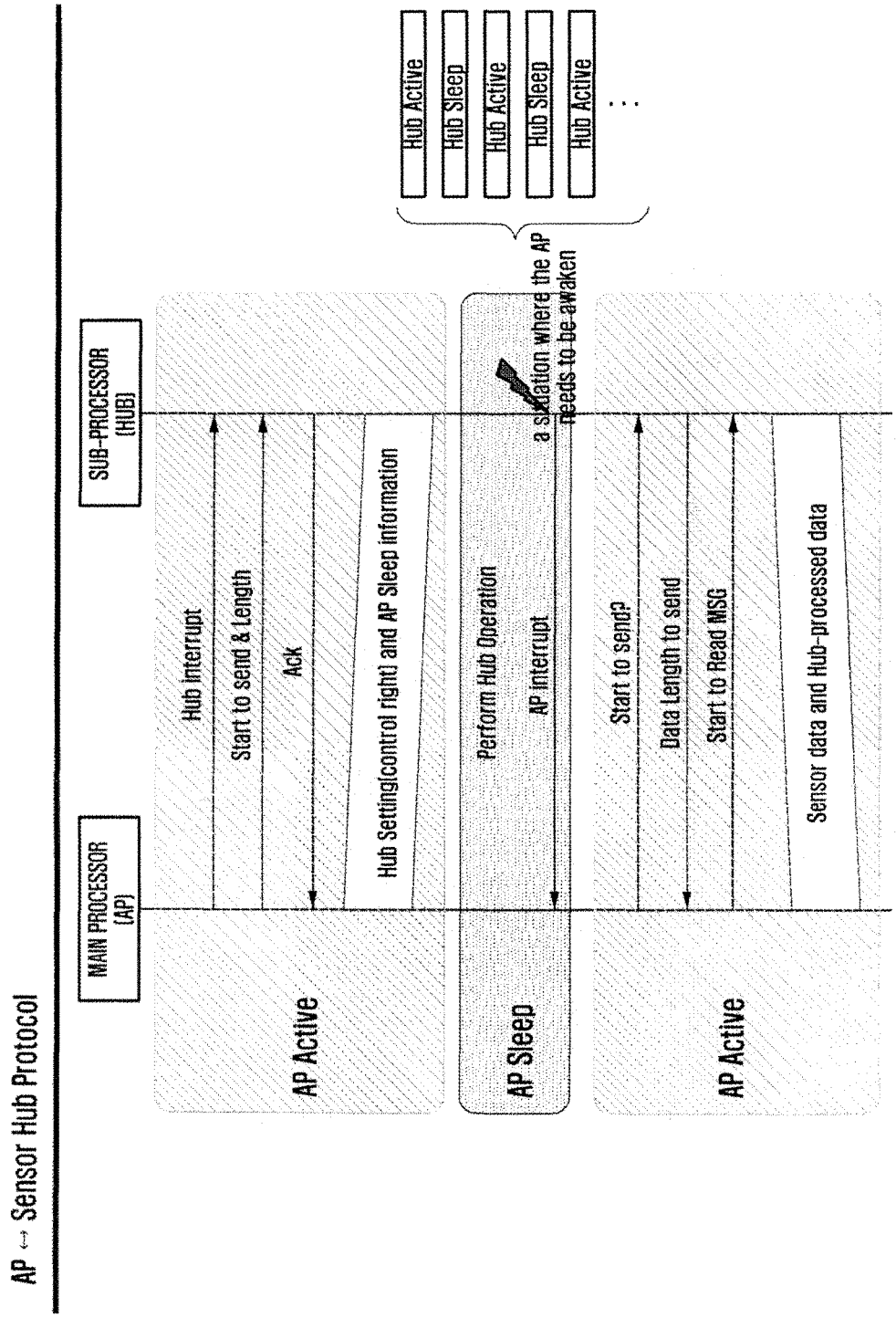
FIG. 3B is an exemplary overview of an AP Processor to Hub Processor Protocol according to an illustrative aspect of the present invention.

As shown in FIG. 3B, while the main processor is active, an exchange occurs between main processor and a sub-processor according to a HUB protocol. First, a hub interrupt is sent by the main processor to the sub-processor, and wherein the main processor sends length information (e.g. data length information) and data information for initiating data transmission to the sub-processor. In turn, the sub-processor sends an acknowledgement back to the main processor. At this point, the hub (sub-processor) sets the control right and AP sleep information.

With continued reference to FIG. 3B, it can be seen that the sub-processor keeps varying states between active and sleep. When a situation arise where the main processor needs to be awakened, an AP interrupt id from the sub-processor to the main processor. Once the main processor is awakened, the main processor remains in an active state and starts to send information to the sub-processor. In turn, the sub-processor indicates to the main processor the data length to send. Next the main processor starts to read a message from sub-processor, which can comprise sensor data and sub-processed data.

Figure 3C:
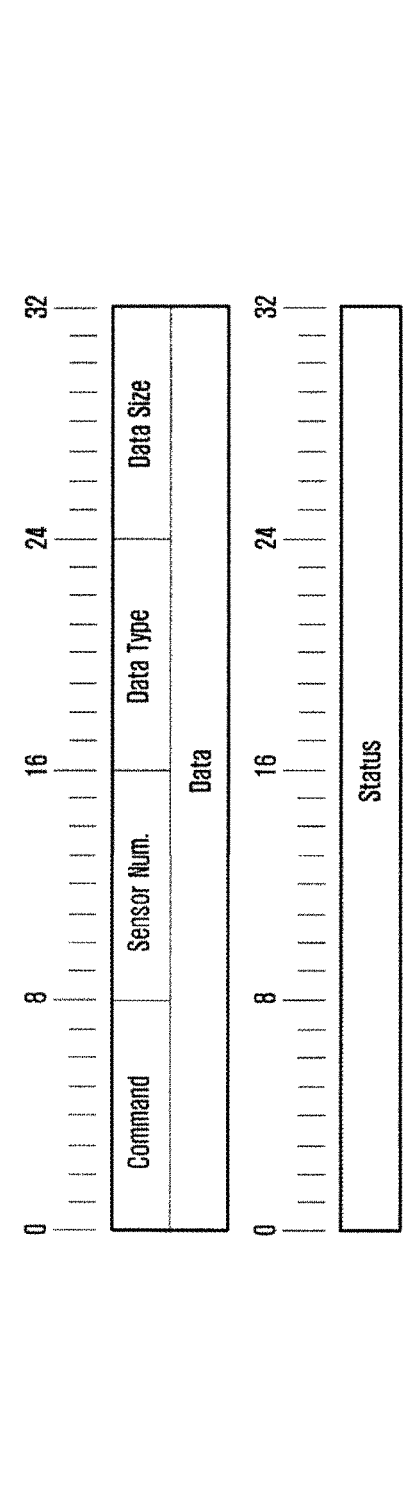
FIG. 3C is an example of a message frame that can be used with an AP to Hub Protocol according to an illustrative aspect of the present invention.

FIG. 3C shows an example of a main processor to sub-processor (i.e. AP to Hub Protocol Message Frame) that can be used according to an exemplary aspect of the present invention.

Referring now to FIG. 3C, it is shown that an exemplary frame can be 8 bytes, with a command field commanded by the AP (main processor) to the Hub (sub-processor), a sensor number field specifying a particular sensor, s data type showing the content of the operand being transmitted, a data size field providing the actual data that follows. Each of the aforementioned parts of the message frame can be 1 byte in length, and the data and status can be 4 bytes each so as to total 8 bytes, for example.

Figure 3D:
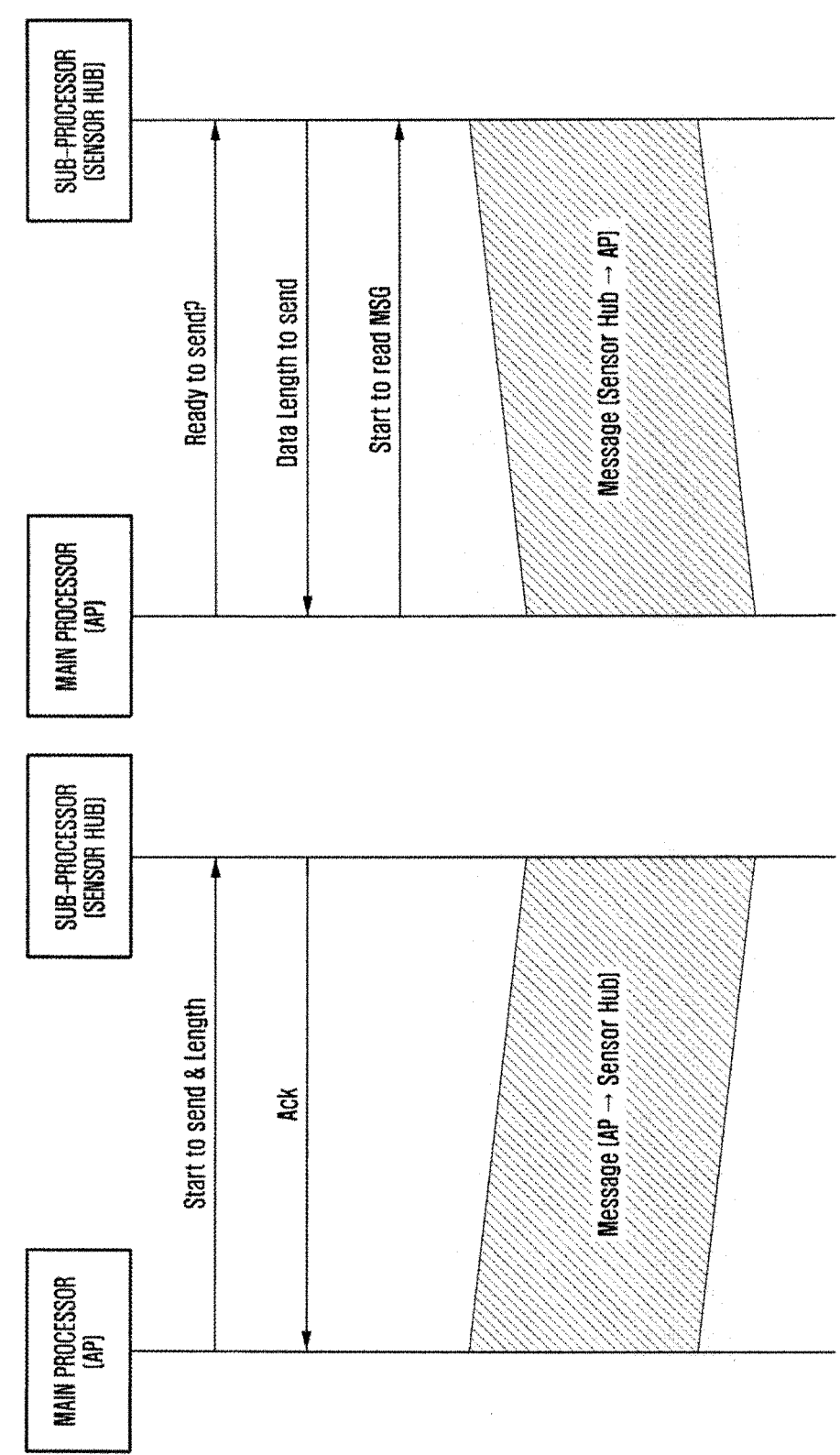
FIG. 3D is an example of an AP processor communicating with a second processor hub, according to an AP to Hub protocol that can be used with the present invention.

FIG. 3D shows another example of AP (main processor) to Hub (Sub-processor Protocol according to a non-limiting exemplary aspect of the present invention. These actions are similar to what is shown in FIG. 3B while the AP is in the active mode.

Figure 4:
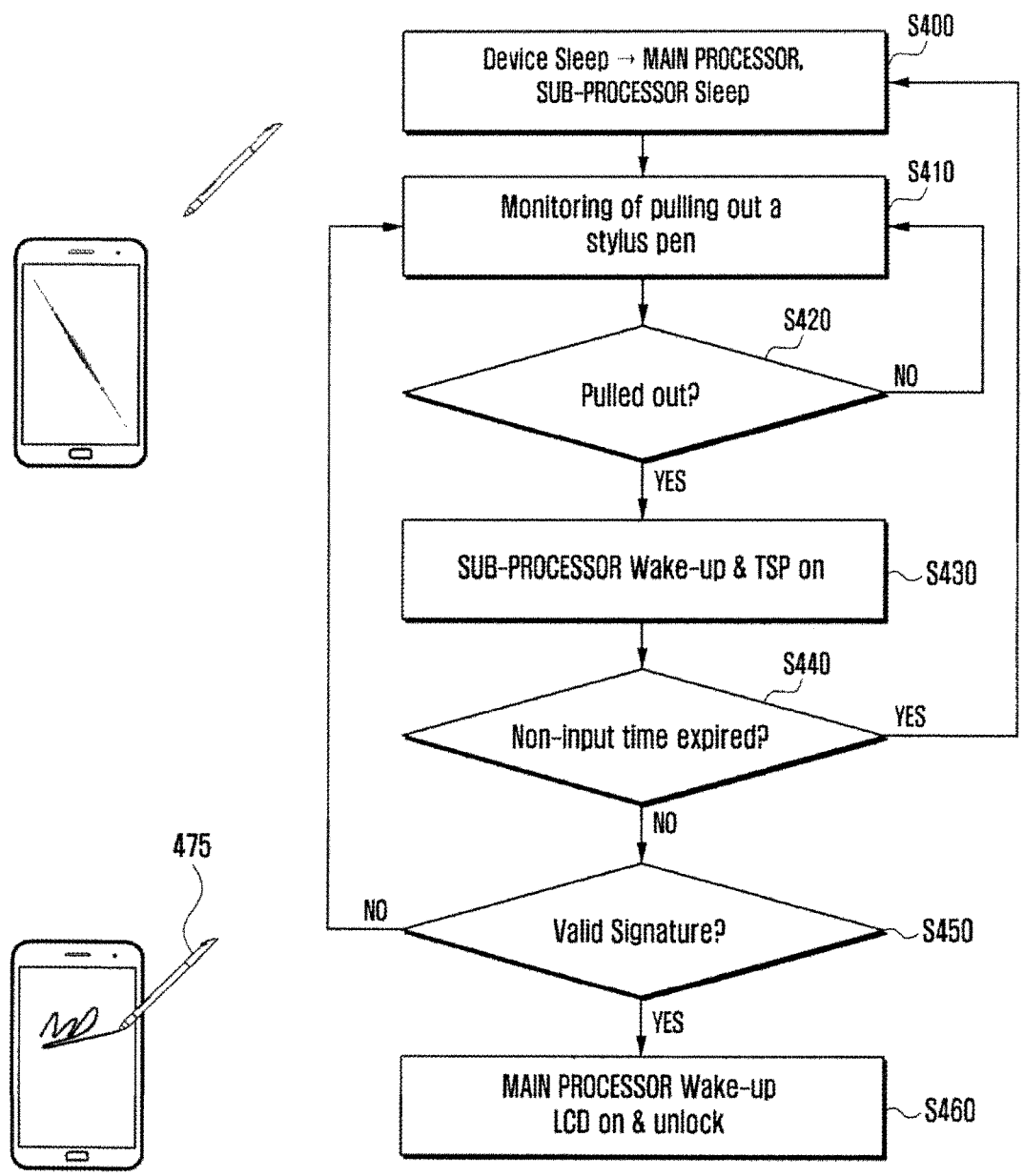
FIG. 4 shows a flowchart illustrating exemplary operation of a signature unlock based on stylus movement according to an exemplary aspect of the invention.

FIG. 4 shows a flowchart illustrating exemplary operation of a signature unlock based on stylus movement according to an exemplary aspect of the invention.

With reference to FIG. 4, at step 400, the main processor and sub-processor are in sleep mode. At step 410, the presence of a stylus pen 475 is monitored to determine whether the stylus pen has been removed from a holder on the electronic device. At step 420, when it is determined that the stylus pen is removed, sub-processor wakes up at 430. If at step 440, the non-input timer has expired, the main processor and sub-processor go back to sleep mode, otherwise, at step 450 it is determined whether a signature is valid, and if so, then main processor wakes up, and the display LCD is turned on and unlocked (step 460).

Figure 5:
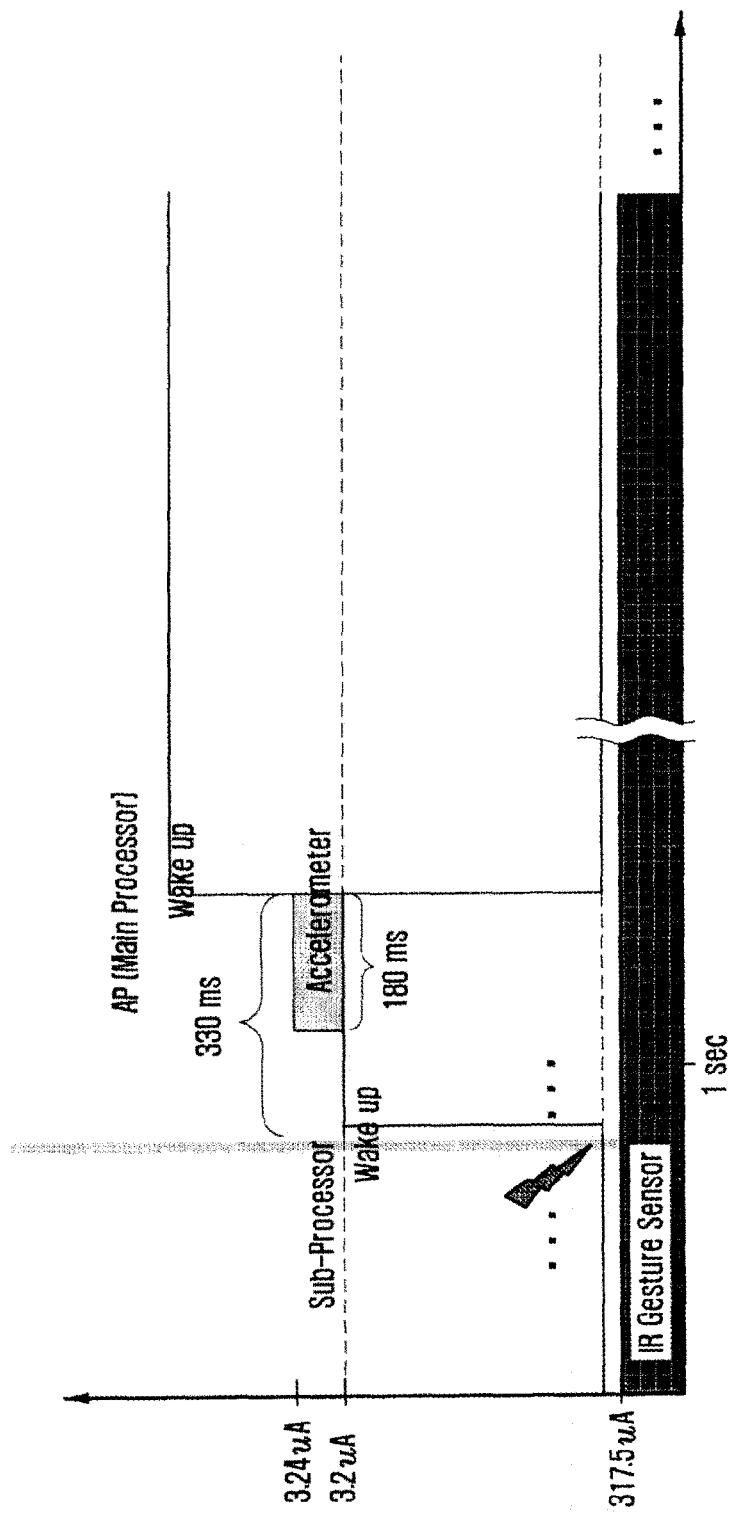
FIG. 5 shows a current profiling example according to an exemplary aspect of the invention.

FIG. 5 shows a current profiling example according to an exemplary aspect of the invention. In this particular non-limiting example, The X axis is time, and the Y-axis is current consumption which comprises milliamps and microamps.

As shown in FIG. 5, the IR gesture sensor (interrupt sensor) consumes at 317.5 uA of current. The sub-processor in this example consumes about 3.2 uA when awakened due to the IR gesture sensor sensing a change in the ambient condition. Within about 330 ms of waking up the sub-processor may wake up the main processor to perform a function, and upon doing so, the sub-processor goes back to sleep. The main processor consumes considerably more current than the sub-processor. Also, in the example of FIG. 5, it is shown that the accelerometer can cause the main processor to wake up within 180 ms.

Figure 6:
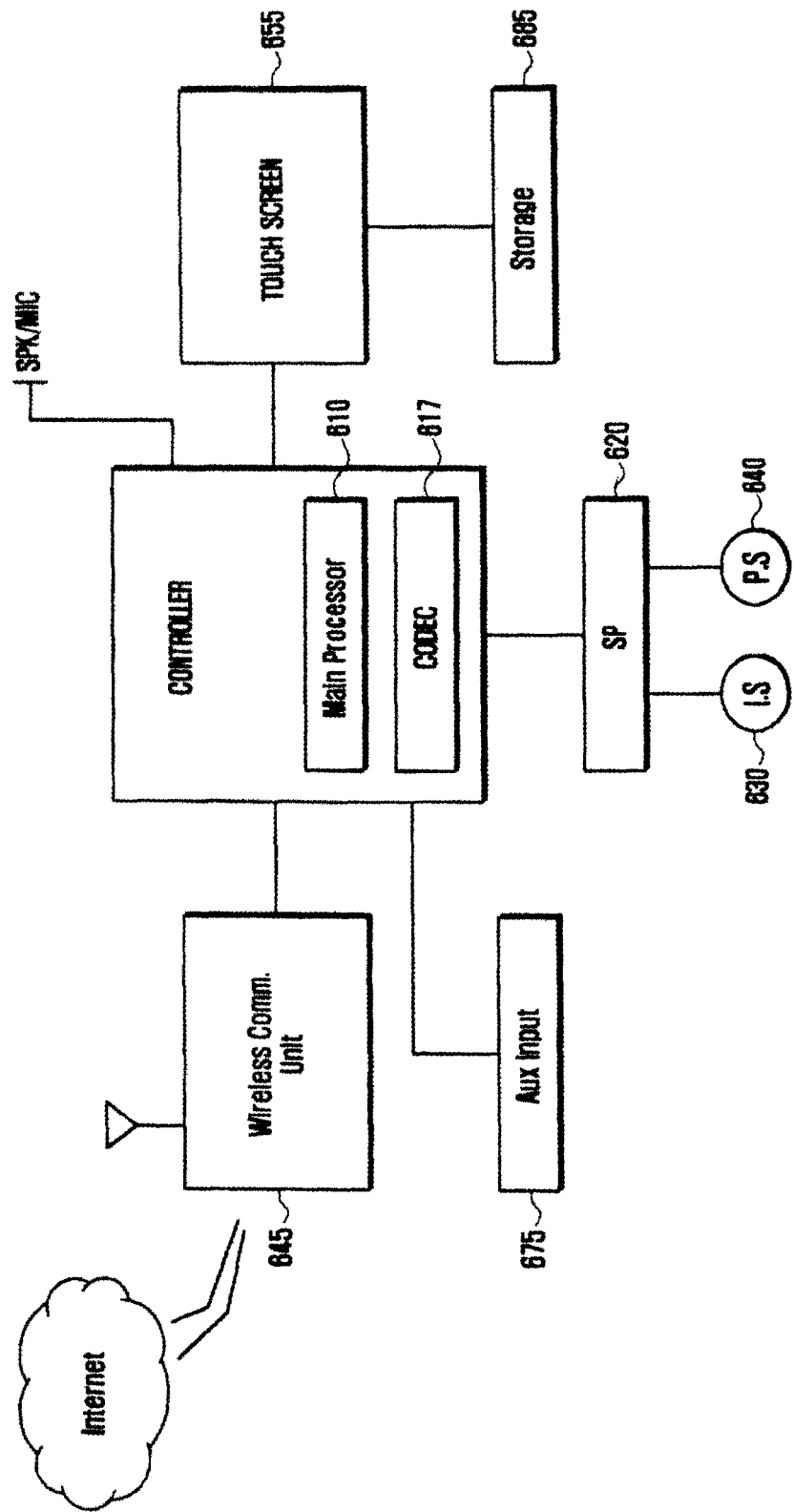
FIG. 6 shows an example of a wireless device incorporating the present invention.

FIG. 6 shows one possible example of a wireless device incorporating the present invention. An artisan understands and appreciates that a plurality of both wired and wireless devices can benefit from the claimed invention. Some non-limiting examples include smartphone, tablet, PDA, music player, etc. just to name a few examples. A controller includes the main processor 610 and a codec 617, the controller communicates with sensing processor 620. The interrupt sensor 630 and the polling sensor 640 are shown schematically, but their actual proximity to the controller us likely to be different than shown.

Touch screen 655 permits display and entry of data. Storage device 685 is in communication with the controller, and comprises a non-transitory machine readable medium.

Auxiliary input 675 can be anything from a keyboard to a mouse, and wireless communication device, shown as a single box, may be different hardware modules for transmitting in short range communication such as Near Field Communication, Bluetooth, WLAN, 802.11, RF communications, etc.

In the invention, the ambient environment is monitored by an interrupt sensor, so that the sub-processor and the main processor (application processor) can remain together in sleep mode. Not only does the invention save power, but provides the user with a convenience in that there is no requirement to push a button to activate/convert the device from a sleep mode back to a normal operating mode.

The sensing of a swiping near the device is sufficient to awake the device from sleep mode, or alternatively, shaking or waving the device, also restores the device to a normal operating state by waking it up.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as, flash, an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

What is claimed is:
1. A method comprising:
    while a first processor and a second processor are in a continuous sleep state, receiving an event;
    responsive to the event, interrupting the second processor, causing the second processor to enter an active state;
    receiving a trace input via a touch screen, the touch screen being operatively coupled with the second processor while the first processor is in an inactive state;
    determining by the second processor, whether the trace input corresponds to data including a signature pattern in relation to an user touch input transmitted from the first processor to the second processor while the first processor was in an active state; and
    sending a signal from the second processor to the first processor to transition the first processor from the sleep state to the active state based at least in part on a determination that the trace input corresponds to the data
    wherein the event comprises removal of a stylus from a holder,
    wherein causing the second processor to enter an active state further comprises causing the second processor to enter the active state for at least a predetermined period of time, responsive to removal of the stylus from the holder;
    the method further comprising:
    returning the second processor to the continuous sleep state when during the predetermined period of time, the second processor does not determine that the trace input corresponds to data including a signature pattern.
2. The method of claim 1, wherein the receiving comprises:
    transitioning the second processor from the active state to the sleep state if no input has been obtained at the second processor for a specified time period.

3. The method of claim 1, wherein the second processor is operated using a second power level, and the first processor is operated using a first power level higher than the second power level.

4. The method of claim 1, wherein the transitioning comprises:
performing a specified function in response to the input using the first processor transitioned to the active state.

5. The method of claim 4, wherein the specified function comprises:
a function to unlock a locked function of an electronic device.

6. The method of claim 1, further comprising:
transitioning the second processor from the active state to the sleep state based at least in part on a determination that the trace input does not correspond to the signature pattern.

7. The method of claim 1, wherein the trace input comprises writing with a stylus.

8. An apparatus comprising:
a first processor;
a second processor; and
a touch screen configured to detect an event while the first processor is in a continuous sleep mode and a second processor is in an active mode;
wherein the second processor is configured to:
receive an interrupt responsive to the event, causing the second processor to enter an active mode;
receive a trace input from the touch screen;
determine whether the trace input correspond to a predetermined signature;
when the trace input corresponds to the predetermined signature, send to the first processor a request to transition the first processor from the sleep mode to the active mode,
wherein the first processor is configured to display the trace input in response to the request from the second processor.

9. The apparatus of claim 8, wherein the second processor are configured to:
transition to the active mode in response to the input while the first processor is in the sleep mode.

* * * * *